(12) United States Patent
Thaniyavarn (10) Patent No.: US 7,660,491 B2
(45) Date of Patent: Feb. 9, 2010

(54) HIGH-DYNAMIC-RANGE ANALOG FIBER-OPTIC LINK USING PHASE MODULATION AND TUNABLE OPTICAL FILTER

(75) Inventor: Suwat Thaniyavarn, Redmond, WA (US)

(73) Assignee: EOSpace, Inc., Redmond, WA (US)

( * ) Notice: Subject to any disclaimer, the term of this patent is extended or adjusted under 35 U.S.C. 154(b) by 244 days.

(21) Appl. No.: 11/882,351

(22) Filed: Aug. 1, 2007

(65) Prior Publication Data

US 2009/0074421 A1   Mar. 19, 2009

Related U.S. Application Data (60) Provisional application No. 60/840,220, filed on Aug. 24, 2006.

(51) Int. Cl.
 *H04B 10/00* (2006.01)
 *G02F 1/01* (2006.01)
 *G02F 1/035* (2006.01)

(52) U.S. Cl. ............. 385/3; 398/116; 398/141; 398/150; 385/1; 385/2

(58) Field of Classification Search ............. 385/1–3; 398/115–117, 140, 141, 150, 188, 201, 207
See application file for complete search history.

(56) References Cited

U.S. PATENT DOCUMENTS

| 6,115,162 A | 9/2000 | Graves et al. |
|---|---|---|
| 6,643,417 B2 | 11/2003 | Strutz et al. |
| 6,996,345 B1 * | 2/2006 | Chen ............. 398/183 |
| 2003/0030868 A1 | 2/2003 | Sasai et al. |

* cited by examiner

*Primary Examiner*—Daniel Petkovsek
(74) *Attorney, Agent, or Firm*—James Creighton Wray; Meera P. Narasimhan (57) ABSTRACT

A cw-laser source transmits low-noise, narrow-linewidth optical power via an optical fiber to a bias-free electro-optic phase modulator at a remote site, where an antenna or an RF sensor is located. The RF electrical signal modulates the phase modulator at the remote site, converting an electrical signal into an optical signal. The phase-modulated optical signal is fed back via the optical fiber to an optical filter whose filter transfer characteristics can be tuned and reconfigured to cancel the intermodulation distortion terms, particularly the dominant $3^{rd}$ order intermodulation, as well as the $2^{nd}$ order. The filtered optical signal is converted to the RF signal at the photodetector. The optical filter is used to effectively "linearize" the signal at the receiver end, rather than at the modulator end.

28 Claims, 9 Drawing Sheets

HIGH-DYNAMIC-RANGE ANALOG FIBER-OPTIC LINK USING PHASE MODULATION AND TUNABLE OPTICAL FILTER

This application claims the benefit of U.S. Provisional Application No. 60/840,220, filed Aug. 24, 2006, which is hereby incorporated by reference in its entirety.

BACKGROUND OF THE INVENTION

Analog RF (Radio Frequency) and microwave Fiber-Optic Links are commonly used in the transmission of signals from antennas and electrical sensors from remote locations.

The analog RF electrical signal is first converted into optical signal using an electro-optic modulator. Then the optical signal is transmitted through the optical fiber to another location where the optical receiver converts the optical signal back to an electrical signal.

There are many ways to implement an analog fiber-optic link. One of the most basic analog fiber-optic link employs a laser source, an electro-optic modulator for converting the electrical signal into optical signal, optical fibers as the transmission medium and a photo-detector for converting the optical signal back to an electrical signal. The electrical signal, with frequencies ranging from DC to >100 GHz, can be converted to optical signal using an electro-optic modulator.

Modulated analog fiber-optic links are widely used. The most common analog RF fiber-optic link uses an electro-optic intensity modulator to convert the electrical signal into an optical signal. There are several types of intensity modulators. The most commonly-employed intensity modulators for that application are Mach-Zehnder (MZ) Interferometric modulators, based on lithium niobate ($LiNbO_3$) electro-optic waveguide technology. There is ample literature on this type of analog RF fiber optic links using MZ modulators.

An MZ interferometric intensity modulator is a simple device in which the optical transmission characteristic, as a function of the applied input voltage to the device, is in form of a sinusoidal function. In general, the MZ modulator needs to be biased with a DC voltage to set the operating point at half-power transmission point of the sinusoidal transfer function. This half-power operating point is where the optical transmission vs. applied voltage is at maximum linearity, and the second order derivative is zero. This MZ intensity modulation fiber-optic link, with MZ biased at this half-power point, is commonly used for wideband (multi-octave) RF analog signal transmission.

However, the performance of an MZ-based fiber-optic link is limited by issues associated with the operating point/DC bias voltage stability, which can be affected by many factors including environmental conditions such as changes in temperature. If the operating point is not exactly at the half-power point, the linear transfer characteristic is affected. This will result in degradation in the performance of the fiber-optic link, particularly the spurious-free dynamic-range, due to intermodulation signal distortion ($2^{nd}$, $3^{rd}$ order and etc.). There is ample literature on this subject.

Since the electro-optic modulator needs to be right at the RF sensor or antenna at the remote site, the modulator is typically subjected to greater temperature variation and other environment factors. A DC bias voltage is required to be applied to the modulator, and the proper bias voltage also needs to be adjusted and tracked so that the operating point of the MZ modulator remains at the maximum linearity point. The need for the DC bias voltage and tracking electronics means electrical power is needed at the remote site. This requirement is undesirable for many applications, and tracking electronics can also adversely affect the performance of the overall fiber-optic link.

In addition, even with the operating point maintained at the half-power, $2^{nd}$ derivative null point, the spurious-free dynamic range of a MZ intensity modulated link is still limited by the $3^{rd}$ order intermodulation distortion caused by the limited linearity of the sinusoidal transfer function of the MZ modulator. This is typically the main limiting factor in the spurious-free dynamic-range of a MZ-based analog fiber-optic link.

In order to achieve higher dynamic-range, another type of modulator with enhanced linearity is required. However, these "enhanced linearity" modulators are very difficult to achieve in practice without some performance trade-offs. In addition, an enhanced linearity modulator often means more complex operating point control and feedback electronics. To apply such a device in a remote location has proved to be difficult and impractical.

Phase-modulated analog fiber-optic links can be used. Instead of using a MZ intensity modulator, a phase modulator and a simple optical delay-line filter can be used to construct a bias-free phase-modulated analog fiber optic link. The approach is described in literature.

The benefit of such implementation is that the electro-optic phase modulator does not require any DC bias voltage and, thus, can be placed at the antenna/RF sensor site without the need for any control bias electronics. The optical delay-line filter can be placed far away from the phase modulator via the optical fiber transmission line at the receiver site. In general, the receiver site can be located anywhere and therefore can be located in a controlled environment, in contrast to the antenna which is typically in an open environment exposed to various elements.

It has been shown that the phase modulated link using a phase modulator and a simple delay-line filter can achieve performance similar to that of the MZ link, using suitable design parameters as described in literature. Unfortunately, the spurious-free dynamic-range of this bias-free phase modulated link using a single delay-line optical filter also is limited by the $3^{rd}$ order intermodulation, similar to that of the MZ link.

Problems which need solutions continue to exist. This limitation on the spurious-free dynamic range of a typical Analog Fiber-Optic link due to this $3^{rd}$ order intermodulation distortion makes the link, based on either MZ intensity modulation or Phase modulated link with delay-line filter, not adequate for many higher performance systems, in which much higher spurious-free dynamic range is required.

There is a critical need to develop a higher performance Analog RF Fiber-optic link that can achieve a much greater dynamic-range, yet is simple to implement and operate.

SUMMARY OF THE INVENTION

The basic concept of this novel high-dynamic-range analog fiber optic link is to use a bias-free phase modulator at the remote site where the antenna/RF sensor is located. Instead of using a simple optical delay-line filter, an optical filter is used with a proper filter characteristic in which the intermodulation distortion terms of the phase modulated link are suppressed. The particular, the key limiting $3^{rd}$ order intermodulation term is suppressed, resulting in a much higher dynamic-range.

In other words, unlike the conventional approach for achieving enhanced dynamic range by various techniques of "linearizing" the optical modulator, the new approach, in effect, is to "linearize" the optical signal at the receiver by using the proper optical filter to suppress the intermodulation distortion terms.

The invention provides a new high-dynamic-range phase-modulated fiber-optic link with optical filter.

The basic enhanced dynamic-range fiber-optic link invention has a cw-laser source that transmits low-noise, narrow-linewidth optical power via optical fiber to a bias-free electro-optic phase modulator at a remote site, where the antenna or an RF sensor is located. The RF electrical signal modulates the phase modulator at this remote site converting an electrical signal into an optical signal. The phase-modulated optical signal is fed back via the optical fiber to an optical filter whose filter transfer characteristics can be tuned and reconfigured to cancel the intermodulation distortion terms (particularly the dominant $3^{rd}$ order intermodulation, as well as the $2^{nd}$ order). The filtered optical signal is converted to the RF signal at the photodetector. Thus, the optical filter is used to effectively "linearize" the signal at the receiver end, rather than at the modulator end.

Although, a variety of optical filters with a fixed transfer function or with very limited reconfigurability can be used, the intermodulation distortion terms, which limit the spurious-free dynamic-range of the fiber-optic link, can be suppressed only to limited degrees in practice, due to fabrication, and operational tolerance. Imperfect transfer characteristics of the filter or other devices in the fiber-optic link, as well as the effect of environmental factors such as temperature to the filter characteristics will limit the level of intermodulation signals cancellation.

The new preferred method uses a tunable/reconfigurable optical filter whose filter transfer function can be "reconfigured" and fine-tuned. In order to achieve enhancement in the spurious-free-dynamic-range, the intermodulation terms (such as the $2^{nd}$, $3^{rd}$, and etc.) must be suppressed to a very high level of accuracy.

This is the reason why a tunable/reconfigurable optical filter is the key to achieve high spurious-free dynamic-range, since the filter characteristics can be fine-tuned to achieve deep cancellation of the intermodulation signals. In addition, it allows the adjustment/reconfiguration of the filter function to compensate for the ever-changing of the link parameters due to environmental or other effects to keep maintaining deep cancellation of the intermodulation distortion terms.

There are many optical filter designs (Febry Perot, transversal filter, and etc.) that may allow one to achieve higher dynamic-range than that of a simple sinusoidal delay-line filter which limits the dynamic range of the fiber-optic link by the $3^{rd}$ order intermodulation. However, the new preferred tunable/reconfigurable optical filter is based on multi-stage optical delay-line filters whose filter transfer functions can be reconfigured and continuously fine-tuned, owing to its simplicity of design, fabrication and great flexibility of tunability and reconfigurability.

The new preferred tunable/reconfigurable multi-stage optical delay-line filter has filter transfer characteristics that can be represented by the Fourier series transform.

The most basic filter design is a 2-stage optical delay-line filter, in which essentially, two simple single-stage delay-line filters are interconnected in series. One filter stage has a differential delay-line twice as long as the other stage. One of the implementations is a 2-stage reconfigurable optical filter.

A reconfigurable 2-stage optical delay-line filter device can be implemented in form of a singlemode optical waveguide circuit. The basic device has three tunable 2×2 directional coupler waveguides that are interconnected via two pairs of differential optical delay-line waveguide pairs with differential optical delays of $\Delta L$ and $2\Delta L$. Both of these differential waveguide delay-line pairs has differential phase shifters.

This reconfigurable filter can be fabricated in many forms such as all-in-fibers, with mechanical or thermo-optic means to tune the fiber couplers and the differential phase shifters. It can also be fabricated in integrated optical waveguide circuit such as silica or silicon waveguides on a substrate with thermo-optic or mechanical-stress, for example, tuning elements to tune the directional couplers and the differential phase shifters.

It can also be fabricated on electro-optic material such as lithium niobate, electro-optic polymer, or semiconductor material. When implementing on linear electro-optic material such as lithium niobate, a very low-loss optical waveguide circuit can be made to form a complete reconfigurable filter.

Since very high-speed electro-optic effect can be used, this allows the construction and use of very-high-speed (subnanoseconds) tuning/reconfiguration of such optical filter.

Such a basic two-stage filter has a filter transfer function that resembles truncated Fourier series expansion, in form of $a_0+a_1F(\omega)+a_2F(2\omega)+a_3F(3\omega)$, where $a_n$ . . . are the Fourier coefficients for the $n^{th}$ Fourier term. The Fourier coefficients are tunable and are related to the tunable couplers and the differential phase tuner settings. By tuning the couplers and the differential phase shifters, the corresponding Fourier coefficients can be adjusted. And thus the filter function can be synthesized using the Fourier series transform function, and the filter can be dynamically reconfigured by simply adjusting the electro-optically tunable directional coupler and phase shifter sections.

Since this type of filters have additional higher order Fourier series filter terms, whose coefficients can be adjusted, one can reconfigure this filter to effectively cancel the $2^{nd}$ and $3^{rd}$ order intermodulation term to enhance the overall spurious-free dynamic-range of the RF fiber-optic link. The important $3^{rd}$ order intermodulation signal cancellation by fine-tuning the filter fabricated on lithium niobate substrate has been successfully demonstrated by adjusting the voltages applied to the phase shifters and the directional couplers to effectively cancel the $3^{rd}$ order intermodulation. With the $3^{rd}$ order intermodulation distortion term cancellation, the dynamic range of the fiber optic link is no longer limited by the $3^{rd}$ order distortion, and thus yielding an enhancement in the overall dynamic range of the fiber-optic link.

Fine/continuous high-speed electro-optical tunability is one of the keys to achieve deep intermodulation signal cancellation to achieve the highest dynamic-range. Higher order Fourier filter terms can be added by simply adding additional stages to the filter to cancel the $4^{th}$, $5^{th}$ order and etc. to achieve the ultimate in spurious-free high dynamic range.

The physical size and insertion loss of the optical filter depends on the size of the differential delay-lines. Since the differential delay-line length is directly linked to the RF/Microwave signals that need to be transmitted, the higher the RF frequency, the shorter optical delay-line section need to be. And thus, this type of filter is more compact, lower-loss and easier to build at higher and higher frequencies (microwave to millimeter wave). Higher-dynamic-range analog links are actually easier using this invention when the RF frequency is higher. This is quite unique, since most other techniques are generally much more difficult as the RF frequency goes up to 10, 20, 40, 60 GHz, and etc. This invention allows the realization of a very-high-frequencies (microwave-millimeter-wave frequencies) Analog fiber-optic link with enhanced dynamic-range. This is very significant, since electrical transmission line at these high frequencies are extremely high loss and are no longer practical for any long distance transmission. This type of high-dynamic-range analog fiber-optic transmission opens up new system architecture for these microwave/mm-wave frequencies systems.

Tunable/reconfigurable multi-stage optical delay-line filters designs are described herein. There are several possible variations in the exact implementation of the reconfigurable multi-stage delay-line filters, for example, a simple three-stage tunable filter with three stages of differential delay lines of length $\Delta L_1$, $\Delta L_2$, $\Delta L_3$. The relationships between $\Delta L_1$, $\Delta L_2$, $\Delta L_3$ do not have to be multiples of each other. Other relations will yield a different optical filter which may be suitable for more specific applications. The filter function of such filter is fairly simple to calculate. More device stages can be added to yield more complex filter functions.

In addition, other configurations are possible. For example, the directional coupler can be replaced by a 1×2 Y-junction splitter, and between device stages, one of the directional coupler outputs may not have to be connected to the latter stage. This will yield a different filter function which may be useful of specific applications.

These and further and other objects and features of the invention are apparent in the disclosure, which includes the above and ongoing written specification, with the claims and the drawings.

DETAILED DESCRIPTION OF THE INVENTION

Figure 1:
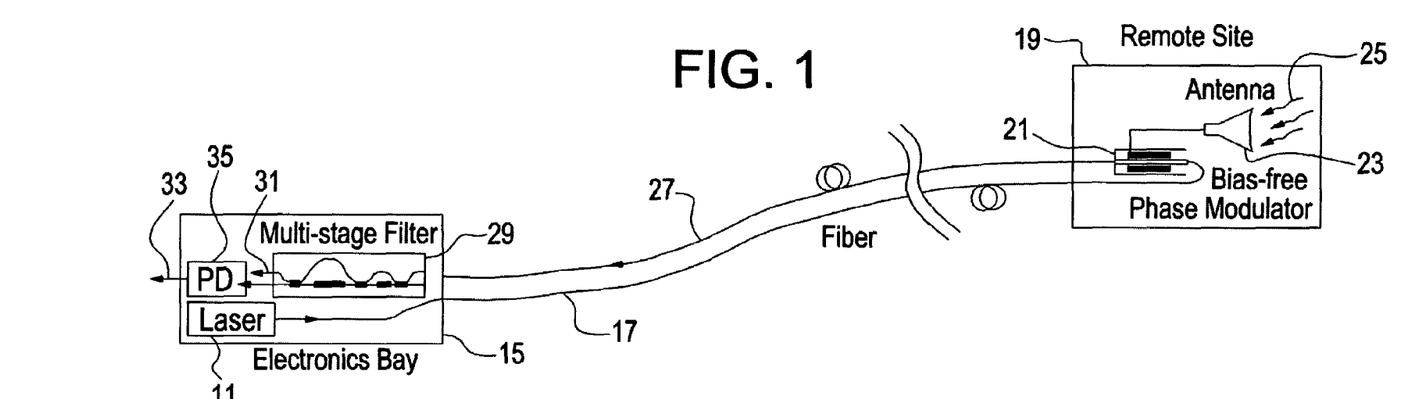
FIG. 1 shows the enhanced dynamic-range phase-modulated RF fiber-optic link using reconfigurable optical filter to effectively linearize the link at the receiver, rather than at the modulator end.

This novel high-dynamic-range analog fiber optic link 10 shown in FIG. 1 has a bias-free phase modulator 21 at the remote site 19, where the antenna 23 or RF sensor is located. Instead of using a simple optical delay-line filter, an optical filter 29 is used with a proper filter characteristic is used in which the intermodulation distortion terms of the phase modulated link are suppressed. The particular, the key limiting $3^{rd}$ order intermodulation term is suppressed, resulting in a much higher dynamic-range.

Unlike the conventional approach for achieving enhanced dynamic range by various techniques of linearizing the optical modulator, the new approach of the invention, in effect, is to linearize the optical signal at the receiver by using the proper optical filter to suppress the intermodulation distortion terms.

FIG. 1 schematically shows the new enhanced dynamic-range phase-modulated RF fiber-optic link using reconfigurable optical filter to effectively linearize the link at the receiver, rather than at the modulator end.

The basic high-dynamic-range phase-modulated fiber-optic link with optical filter is illustrated in the FIG. 1. The basic enhanced dynamic-range fiber-optic link 10 has a cw-laser source 11 in an electronics bay 15 that transmits low-noise, narrow-linewidth optical power via optical fiber 17 to a bias-free electro-optic phase modulator 21 at a remote site 19, where the antenna 23 or an RF sensor is located. The RF electrical signal 25 modulates the phase modulator 21 at this remote site 19, converting an electrical signals into an optical signals. The phase-modulated optical signal is fed back via the optical fiber to an optical filter 29, whose filter transfer characteristics are tuned and reconfigured to cancel the intermodulation distortion terms, particularly the dominant $3^{rd}$ order intermodulation, as well as the $2^{nd}$ order. The filtered optical signal 31 is converted to the RF signal 33 at the photodetector 35. Thus, the optical filter is used to effectively linearize the signal at the receiver end rather than at the modulator end 39.

Although, a variety of optical filters with a fixed transfer function or with very limited reconfigurability can be used, the intermodulation distortion terms, which limit the spurious-free dynamic-range of the fiber-optic link, can be suppressed only to limited degrees in practice, due to fabrication, and operational tolerance. Imperfect transfer characteristics of the filter or other devices in the fiber-optic link, as well as the effect of environmental factors such as temperature to the filter characteristics will limit the level of intermodulation signals cancellation.

The new preferred method of the invention is to use a tunable/reconfigurable optical filter 29 whose filter transfer function can be reconfigured and fine-tuned. In order to achieve enhancement in the spurious-free-dynamic-range, the intermodulation terms (such as the $2^{nd}$, $3^{rd}$, and etc.) must be suppressed to a very high level of accuracy.

This is the reason why a tunable/reconfigurable optical filter is the key to achieve high spurious-free dynamic-range, since the filter characteristics can be fine-tuned to achieve deep cancellation of the intermodulation signals. In addition, it allows the adjustment/reconfiguration of the filter function to compensate for the ever-changing of the link parameters due to environmental or other effects to keep maintaining deep cancellation of the intermodulation distortion terms.

There are many optical filter designs (Febry Perot, transversal filter, etc.) that may allow achieving a higher dynamic-range than that of a simple sinusoidal delay-line filter which limits the dynamic range of the fiber-optic link by the $3^{rd}$ order intermodulation. However, the preferred tunable/reconfigurable optical filter is based on multi-stage optical delay-line filters whose filter transfer functions can be reconfigured and continuously fine-tuned, owing to simplicity of design, fabrication and great flexibility of tunability and reconfigurability.

The preferred tunable/reconfigurable multi-stage optical delay-line filter has filter transfer characteristics that can be represented by the Fourier series transform.

This invention provides high-dynamic-range fiber-optic links and a new technique for using high-dynamic-range RF fiber-optic links that exploits the Fourier filter concept. The new technique employs a bias-free phase modulator at the remote antenna site and a reconfigurable filter at the receiver end.

Unlike more conventional approaches for enhancing dynamic-range by various techniques for linearizing the optical modulator, the new approach is the linearize the optical demodulator function at the receiver instead, using this reconfigurable filter. The new phase-modulator fiber-optic link provides improved fiber-optic link transfer characteristic controlled by adjusting the ΔPhase and ΔFrequency of each of the filter stage. For example, the i-th delay stage is provided by adjusting Δϕ and Δf. The new system provides bias at quadrature for >Octave ($2^{nd}$ harmonic nulls) and provides enhanced linearity by constructing filter function with $3^{rd}$, $4^{th}$, $5^{th}$, etc. nulls. Since the device transfer function takes on truncated Fourier series expansion terms, more stages give more higher order term connections. Only two or three stages are required to give the improved results. More may be used. Non-linear (higher order) terms cancellation employs precise signal amplitude/phase. Lossless linear electro-optic tuning of Fourier series coefficients is a key to achieving maximum linearity. The system expands received signals in terms of Fourier coefficients to the first few orders. Depending on the number of stages, Fourier coefficients can be tuned to match the exact required function for maximum linearity.

Enhanced dynamic-range phase-modulator RF fiber-optic link using a reconfigurable optical filter allows a completely maintenance-free optical phase modulator at a remote antenna site, without the need for a dc bias voltage to the phase modulator. This means the phase modulator can be placed in a harsh environment, e.g., the full military specifications of temperature range, without compromising the signal conversion fidelity. The optical filter at the receiver site, operated as an optical demodulator, can be reconfigured to effectively linearize the output response function to achieve higher spur-free dynamic range. There are several modes of operation for such a phase modulator/reconfigurable filter.

The most basic filter construction is a two-stage optical delay-line filter 40, in which essentially, two simple single-stage delay-line filters P1 and P2 are interconnected in series. One filter stage P2 has a differential delay-line twice as long as the other stage P1. One of the implementation of a two-stage reconfigurable optical filter 40 is shown in FIG. 2.

Figure 2:
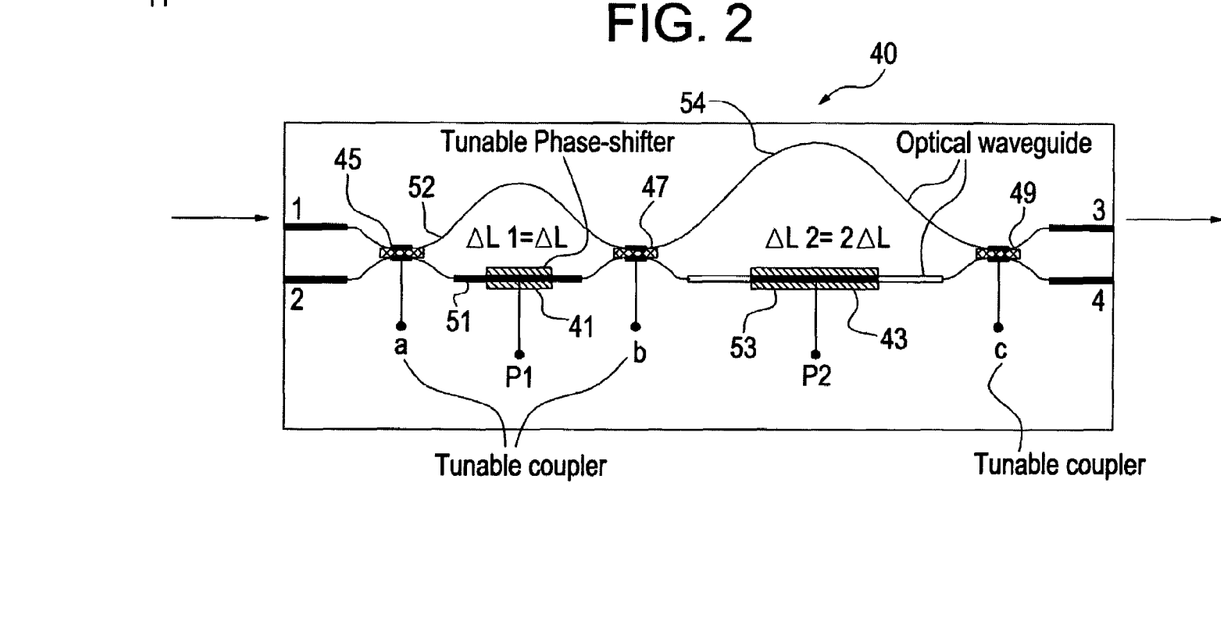
FIG. 2 shows a dual-stage reconfigurable filter implemented in form of optical waveguiding circuit on such material as electro-optic lithium niobate substrate.

FIG. 2 is a schematic representation of a dual-stage reconfigurable filter implemented in form of optical waveguiding circuit on such material as electro-optic lithium niobate substrate. A reconfigurable 2-stage optical delay-line filter device 40 is implemented in this embodiment in the form of a single mode optical waveguide circuit as shown.

This reconfigurable two-stage tunable optical delay-line filter 40 consists of 2 unequal-length optical waveguide pairs P1 and P2 interconnected to each other via 3 tunable 2×2 waveguide directional couplers 45, 47, 49 (labeled as a, b and c in FIG. 2). The first waveguide pair consists of a lower-branch waveguide 51 and an upper-branch 52, shown as curve-waveguide. There is an optical waveguide path difference $[\text{path}(52)-\text{path}(51)]=\Delta L_1=\Delta L$, between the two waveguide paths in this 1st section between the first two tunable directional couplers 45 and 47.

The relative optical phase difference between lightwaves propagating through the two waveguide paths 51 and 52 can be fine-tuned. If the devices are made on electro-optic waveguide material such as lithium niobate, electrode 41 can be integrated to the waveguides on one or both of the waveguide pair 51, 52 to change the relative phase of light between the two paths. The 2×2 tunable couplers 45, 47, 49 can also be fine tuned via electro-optic effect, when electrodes are integrated on the couplers.

The 2nd waveguide pair consists of a lower-branch waveguide 53 and an upper-branch 54, shown as a curve-waveguide. There is an optical waveguide path difference $[\text{path}(54)-\text{path}(53)]=\Delta L_2=2\Delta L$, between the two waveguide paths in this 2nd section between the last two tunable directional couplers 47 and 49.

Note that in this specific case, the 2nd differential delay $\Delta L_2$ of the 2nd section is twice that of the differential delay $\Delta L_1$ of the 1st section. $\Delta L_2=2\Delta L_1=2\Delta L$. However, in general, $\Delta L_2$ can be some other value and does not have to be twice as long as $\Delta L_1$.

Because the filter is fabricated on an electro-optic material, all of the relative optical phases in each differential delay-line filter section can be rapidly tuned by applying voltages, via electro-optic interaction. All the directional couplers can be similarly tuned by applying voltages. These features provide high-speed continuous fine-tuning capability, enabling rapid and accurate reconfigurability of the overall optical filter. This capability is used to achieve intermodulation signals cancellation of the overall phase modulated fiber-optic link, enabling the overall link to achieve extended spurious-free dynamic-range.

This reconfigurable filter 40 can be fabricated in many forms such as all-in-fibers, with mechanical or thermo-optic means to tune the fiber couplers 45, 47, 49 and the differential phase shifters 41, 43. It can also be fabricated in integrated optical waveguide circuit such as silica or silicon waveguides on a substrate with thermo-optic, mechanical or other stress tuning elements to tune the directional couplers and the differential phase shifters.

It can also be fabricated on electro-optic material such as lithium niobate, electro-optic polymer, or semiconductor material. When implementing on linear electro-optic material such as lithium niobate, a very low-loss optical waveguide circuit can be made to form a complete reconfigurable filter.

Since very high-speed electro-optic effect can be used, this allows the construction and use of very-high-speed (subnanoseconds) tuning/reconfiguration of such optical filter.

Such a basic 2-stage tunable/reconfigurable filter has a filter transfer function that resembles truncated Fourier series expansion, in form of $a_0+a_1F(\omega)+a_2F(2\omega)+a_3F(3\omega)$, where $a_n$... are the Fourier coefficients for the $n^{th}$ Fourier term. The Fourier coefficients are tunable and are related to the tunable couplers and the differential phase tuner settings. By tuning the couplers and the differential phase shifters, the corresponding Fourier coefficients can be adjusted. Thus, the filter function can be synthesized using the Fourier series transform function, and the filter can be dynamically reconfigured by simply adjusting the electro-optically tunable directional coupler and phase shifter sections.

Since this new type of tunable/reconfigurable filters has additional higher order Fourier series filter terms, coefficients can be adjusted. One can reconfigure this new filter to effectively cancel the $2^{nd}$ and $3^{rd}$ order intermodulation term to enhance the overall spurious-free dynamic-range of the RF fiber-optic link. The invention provides the important $3^{rd}$ order intermodulation signal cancellation by fine-tuning the filter fabricated on lithium niobate substrate has been successfully demonstrated by adjusting the voltages applied to the phase shifters and the directional couplers to effectively cancel the $3^{rd}$ order intermodulation. With the $3^{rd}$ order intermodulation distortion term cancellation, the dynamic range of the fiber optic link is no longer limited by the $3^{rd}$ order distortion, thus yielding an enhancement in the overall dynamic range of the new fiber-optic link.

Fine/continuous high-speed electro-optical tunability is one of the keys to achieve deep intermodulation signal cancellation to achieve the highest dynamic-range. Higher order Fourier filter terms can be added by simply adding additional stages to the filter to cancel the $4^{th}$, $5^{th}$ order, etc. to achieve the ultimate in spurious-free high dynamic range.

The physical size and insertion loss of the new optical filter depends on the size of the differential delay-lines. Since the differential delay-line length is directly linked to the RF/Microwave signals that needed to be transmitted, the higher the RF frequency, the shorter optical delay-line section needs to be. Thus, this new type of filter is more compact, lower-loss and easier to build at higher and higher frequencies (microwave to millimeter wave). Higher-dynamic-range analog links are actually actually easier using the new technique based on this inventions when the RF frequency is higher. This is quite unique, since most other techniques are generally much more difficult as the RF frequency goes up to 10,20, 40, 60 GHz, and etc. This invention allows the realization of a very-high-frequencies (microwave-millimeter-wave frequencies) and analog fiber-optic links with enhanced dynamic-range. This is very significant, since electrical transmission lines at these high frequencies are extremely high loss and are no longer practical for any long distance transmission. This new type of high-dynamic-range analog fiber-optic transmission opens up new system architecture for these microwave/mm-wave frequency systems.

Figure 3:
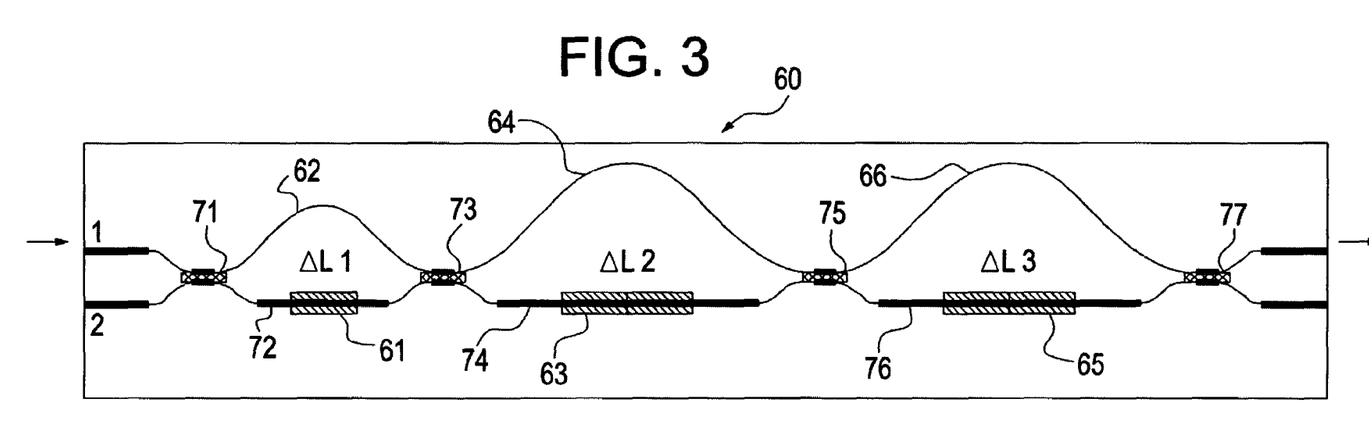
FIG. 3 shows an example of a three-stage reconfigurable filter.

The new tunable/reconfigurable multi-stage optical delay-line filterconstructions have several possible variations in the exact implementation of the reconfigurable multi-stage delay-line filters. FIG. 3 shows a simple 3-stage tunable filter 60 with three stages of differential delay connected by lines of length $\Delta L_1$, $\Delta L_2$, $\Delta L_3$. The relationship between $\Delta L_1$, $\Delta L_2$, $\Delta L_3$ do not have to be multiples of each other. Other relation will yield different optical filters which may be suitable for more specific applications. The filter function of such filter is fairly simple to calculate.

FIG. 3 is a schematic representation showing an example of a 3-stage reconfigurable filter with four directional waveguide couplers 71, 73, 75 and 77.

This 3-stage tunable filter consists of 3 unequal-length optical waveguide pairs, interconnected to each other via four tunable 2×2 waveguide directional couplers 71, 73, 75, 77. The first waveguide pair consists of a lower-branch waveguide 72 and an upper-branch 62, shown as curve-waveguide. There is an optical waveguide path difference [path(62)−path(72)]=$\Delta L_1$, between the two waveguide paths in this first section between the first two tunable directional couplers 71 and 73.

The relative optical phase difference between lightwaves propagating through the two waveguide paths 72 and 62 can be fine-tuned. If the devices are made on electro-optic waveguide material such as lithium niobate, the electrodes 61, 63, 65 can be integrated to the waveguides on one or both of the waveguide pair 72, 62 to change the relative phase of light between the two paths. The 2×2 tunable couplers 71, 73, 75, 77 can also be fine-tuned via electro-optic effect, when electrodes are integrated on the couplers.

Similarly, the 2nd and 3rd of the unequal-length waveguide pairs will have the similar difference in optical path length of $\Delta L_2$ and $\Delta L_3$, respectively. All of the relative phases of the three differential delay-line section can be fine-tuned electro-optically, when the device is fabricated on an electro-optic material. Similarly, all the directional couplers 71, 73, 75, 77 can be fine-tuned electro-optically by applying appropriate voltages.

More device stages can be added to yield more complex filter functions.

Figure 4:
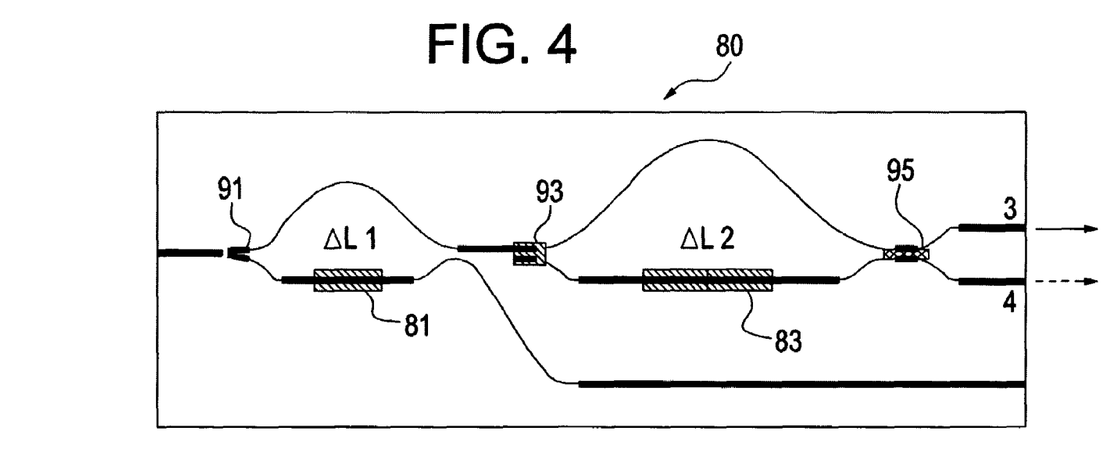
FIG. 4 shows an example of reconfigurable multi-stage filter with variation in the use of directional couplers between stages.

In addition, other configurations are possible. For example, the directional coupler can be replaced by a 1×2 Y-junction splitter 91, and between device stages, one of the directional coupler outputs may not have to be connected to the latter stage as shown in FIG. 4. This will yield a different filter function which may be useful of specific applications.

FIG. 4 is a schematic representation showing an example of reconfigurable multi-stage filter with variation in the use of directional couplers between stages.

FIG. 4 shows a tunable/reconfigurable filter 80 with two stages 81, 83 of differential delay lines. A Y-junction splitter 91 feeds input 90 to stage 81 and to directional coupler 93. Directional coupler 93 feeds stage 83. Coupler 95 connects input to outputs 3 and 4. A separate output 5 is connected to stage 81.

The high-dynamic-range phase-modulated analog fiber-optic link with tunable optical filter of this invention provides many benefits.

It is practical to implement. Only the bias-free, maintenance-free optical phase modulator is needed to be placed at the antenna/RF sensors at the remote site in harsh environment. All the rest of the link, including laser, tunable optical filter and photodetector can be placed far away in controlled environment via low-loss optical fiber. Since, wideband electro-optic phase modulators such as those based on lithium niobate are capable of withstanding extremely wide temperatures, and without the need of maintaining DC operating point and DC bias voltage, this make this new analog fiber-optic link very practical to be implemented in real world operations.

Benefits of this invention achieves greatly enhanced dynamic range. Since the tunable/reconfigurable optical filter can be used to achieve deep cancellation of the uintermodulation distortion terms, much higher overall spurious-free dynamic-range can be achieved. And since the optical filter can be placed in a more controlled environment in front of the photodetector, this will greatly simplify the operation of the filter.

Benefits of this invention provides high-speed operation of the filter. Since the optical element of the tunable/reconfigurable optical filter can be implemented in electro-optic material, this means the optical filter can be tuned/reconfigured at very rapid rate in nanoseconds. The filter is fast enough to rapidly track and is adapted to any change in the environment.

Tunable/reconfigurable optical filter is based on multistage optical delay-line filter architecture and is simple to build. In addition, the size of the optical filter device depends on the differential delay-line sections of the filter, which in turn, depends on the RF signal frequency range of interest. The higher the RF frequency, the shorter the differential optical delay lines need to be. This means that at high microwave frequency, the new tunable filter device is much smaller and has lower loss. The intermodulation distortion terms cancellation is practically independent of the RF frequencies. This means that high dynamic-range analog fiber-optic link may operate even easier at higher and higher frequencies using this technique.

The cancellation of the intermodulation signals using this technique is done in the optical domain, via the use of phase modulator and tunable/reconfigurable optical filters. All electronic controls for the tunable elements (directional couplers and phase shifters) of the tunable optical filter are at relatively low frequencies and are not at the RF frequencies of the signal itself. The electronic controls only have to be fast enough to control and track the changes in the environment which may affect the intermodal signal cancellation of the overall links. Megahertz ranges of response should be more than adequate for most applications. Therefore, this technique is very practical to be applied to very high frequency (microwave and mm-wave) fiber-optic links without the need for any microwave/mm-wave frequency electronics.

This invention allows the realization of very-high-frequency (microwave-millimeter-wave frequencies) analog fiber-optic links with enhanced dynamic-range. This is very significant, since electrical transmission line at these high frequencies are extremely high loss and are no longer practical for any long distance transmission. This new type of high-dynamic-range analog fiber-optic transmission should open up new system architecture for these microwave/mm-wave frequency systems.

The present invention provides practical Extremely High Frequencies ("EHF") RF fiber-optic links with bias-free phase modulated RF fiber-optic links. Reconfigurable filters are a key component for linearization with dual-stage reconfigurable filter devices intermodal cancellation results.

The invention provides RF fiber-optic links at high RF frequencies. At lower RF frequencies, non-fiber solutions exist. Fiber-optic links need lower electro-optical conversion loss, higher dynamic-range with some enhanced linearity techniques and practical and reliable link implementation. At higher RF frequencies, all-electronic solutions are difficult. High-dynamic-range fiber-optic links cause electro-optical conversion loss and make linearization techniques more difficult.

The present invention provides new optical techniques and enabling electro-optical components for high-dynamic-ranges in RF fiber-optic links at high-frequencies, 10-90+ GHz.

The present invention provides a new RF fiber-optic link that is suitable for real-world harsh environment (large$\pm\Delta$ Temperature) operation.

The present invention provides Analog Optical Signal Processing ("AOSP") techniques that are scalable to extremely high RF frequencies and are simpler at higher and higher RF frequencies.

The invention is simple and practical to implement with high-precision tunable/reconfigurable AOSP linearization element, with no need for high-frequency RF electronics.

The invention provides a new phase-modulated RF fiber-optic link with truly-bias-free linear electro-optical phase modulator at remote site in harsh environment, and optical filter in the electronic bay for demodulation.

A dynamically-reconfigurable optical filter is used as the AOSP to effectively linearize the signal at the receiver, rather than at the modulator.

The invention uses a simple multi-storage optical delay-line filter which has a transfer function like that of a programmable Fourier Series filter.

The invention provides deep cancellation of intermods to achieve high-dynamic-range via high precision, loss-less linear/continuous electro-optical tuning.

The simple AOSP component implementation is scalable to extremely high RF frequencies.

Figure 5:
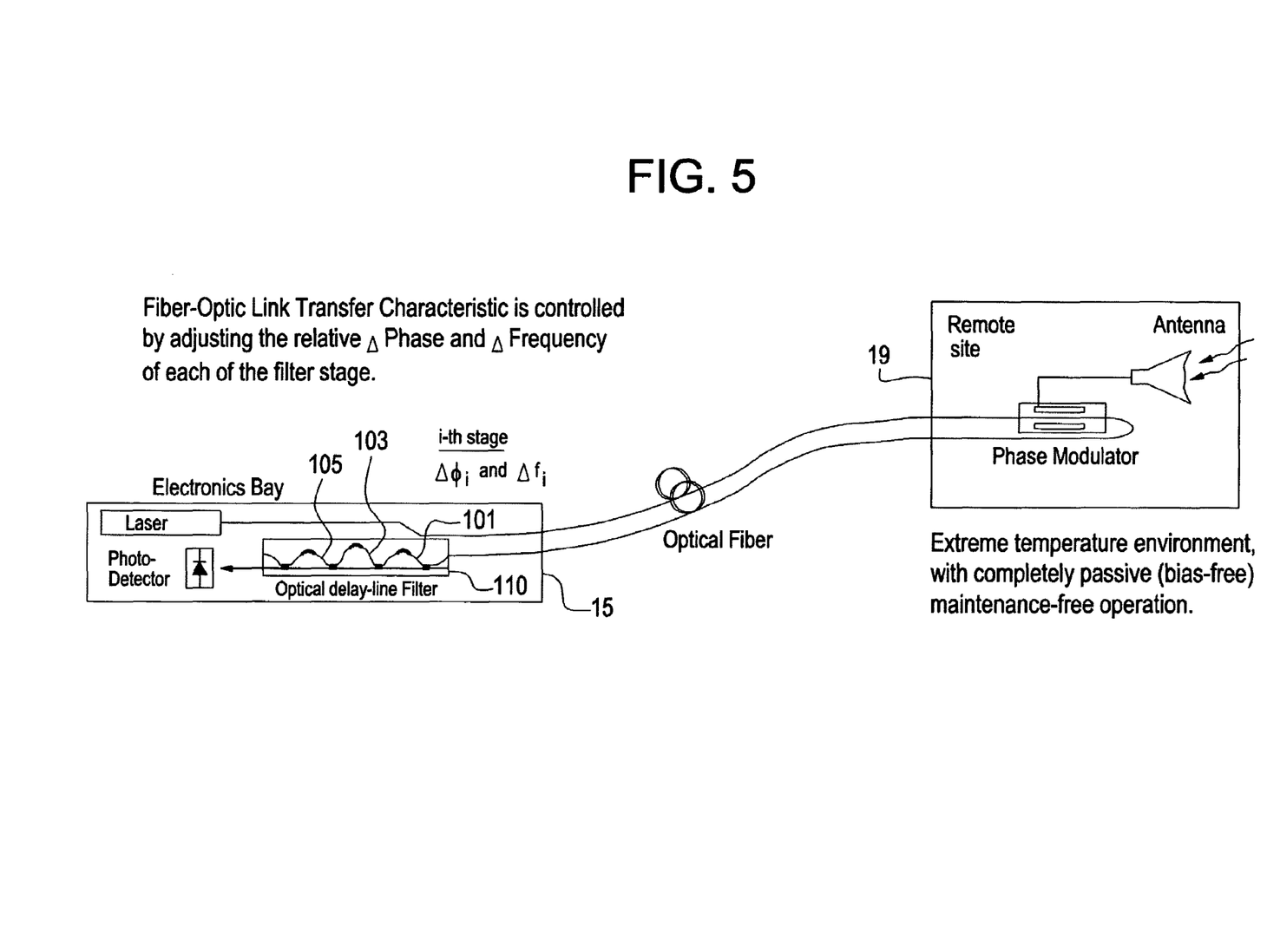
FIG. 5 shows electro-optic reconfigurable optical filter (with higher order terms) used to linearize the phase modulated link, cancelling intermods.

The invention provides a high-dynamic-range RF fiber-optic link that is practical to be deployed in actual harsh military environments of extreme temperature ranges with maintenance-free, bias-free electro-optical converters scalable to high RF frequencies. The fiber-optic link transfer characteristic is controlled by adjusting the relative $\Delta$Phase and $\Delta$Frequency 100 of each of the filter stage as shown in FIG. 5 101, 103, 105.

The RF signal is converted to an optical signal at the remote antenna site using linear electro-optic phase modulator, completely maintenance-free in extreme Mil-spec temperature environments.

Perfect linear RF to optical signal mapping is provided, with all of the original signal characteristics preserved and transmitted back to the remote receiver 15.

High-dynamic-range is achieved by advanced optical signal processing at the receiver 15, using a dynamic reconfigurable Fourier optical filter 110 whose characteristics can be systematically synthesized and very precisely tuned to achieve a very high degree of linearity.

The invention provides a multi-stage optical delay-line filter with electro-optical tunable element, with reconfigurable Fourier series transfer function, providing higher order terms used for intermod cancellation. Other optical filters with the proper transfer function with suitable higher order terms can also be used.

Figure 6:
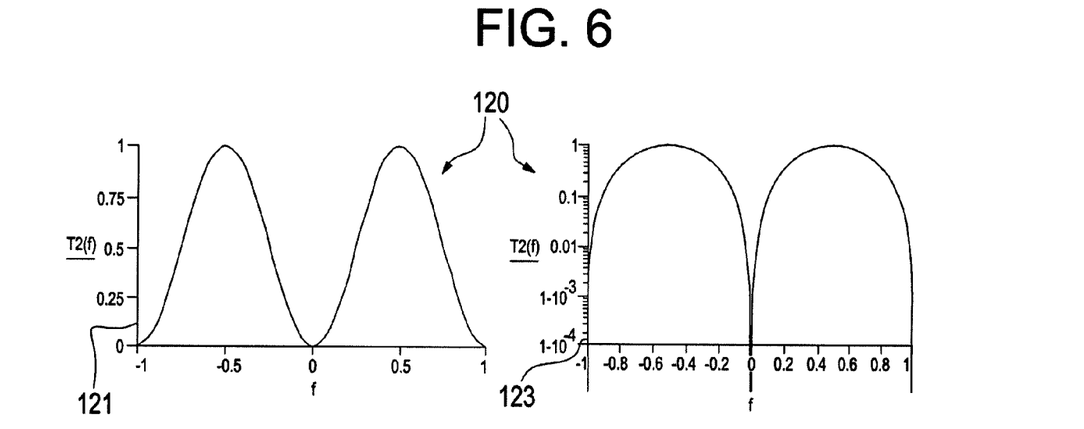
FIG. 6 shows two-stage Fourier filters with sinusoidal filter response as a function of optical frequency.
Figure 7:
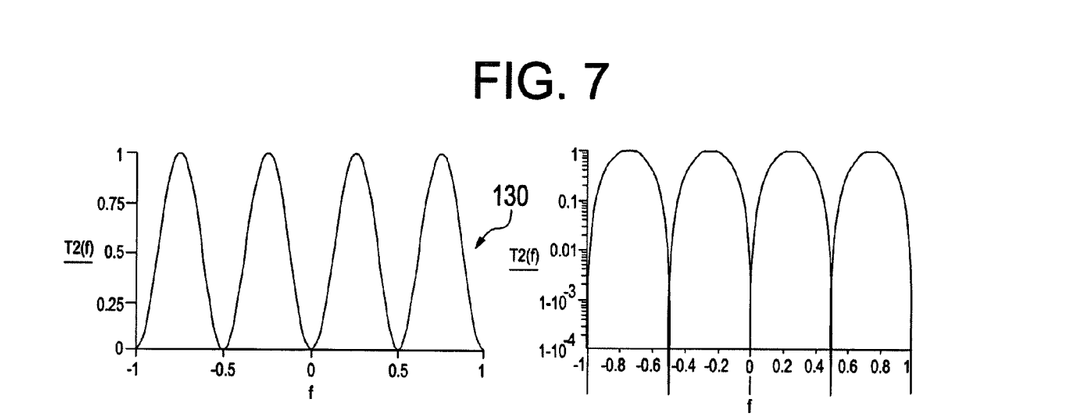
FIG. 7 shows two-stage Fourier filters reconfigured with sinusoidal filter with ½ period.
Figure 8:
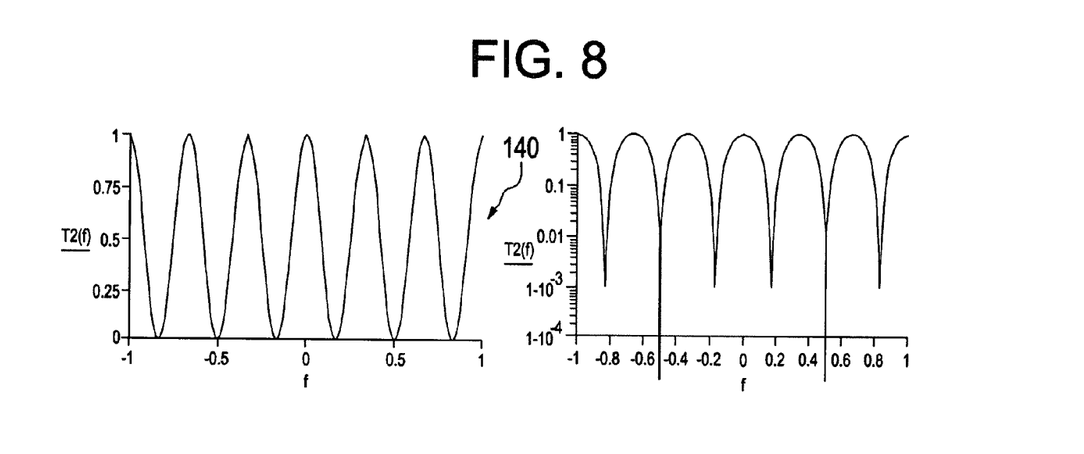
FIG. 8 shows two-stage Fourier filters reconfigured with sinusoidal filter with ⅓ period.

By adjusting the couplers, a, b and c, and the tunable phase shifter P1, P2 in FIG. 2, one can reconfigure the filter with different periods 120, 130, 140 as shown in linear scale 121 and log scale 123 in FIGS. 6, 7 and 8.

The output function takes on the form of a truncated Fourier series:

$$a_0 + a_1 . F_1.(\omega) + a_2 . F_2(2\omega) + a_3 . F_3(3\omega).$$

When implemented in electro-optic material such as $LiNbO_3$, the transfer function can be systematically synthesized using powerful Fourier series transform, a natural/fundamental signal processing function. The Fourier coefficients can be controlled by simply tuning the directional couplers a, b, c. The Phase can be changed (both positive and negative) by tuning the phase tuners P1, P2 in FIG. 2. Filter characteristics can be dynamically reconfigured at high-speed.

The electro-optically tunable/reconfigurable two-stage Fourier series filter 40 shown in FIG. 2 uses the Fourier transform:

$$a_0 + a_1 \cdot F_1(\omega) + a_2 \cdot F_2(2\omega) + a_3 \cdot F_3(3\omega).$$

The Fourier coefficients can be electro-optically controlled very precisely. These additional high-order Fourier terms can be used to effectively cancel the $3^{rd}$ order intermod term that typically limits the dynamic-range of the fiber-optic link.

The loss-less linear electro-optic effects allow very fine and precise adjustment, critical to achieve deep signal cancellation.

More Fourier terms can be added by simply adding additional stages to cancel higher order intermod terms.

Figure 9:
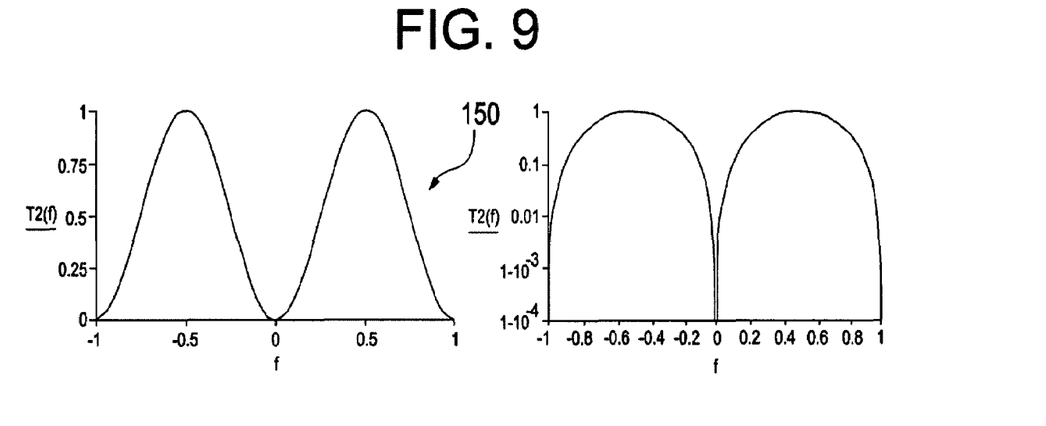
FIG. 9 shows sample of basic Fourier-synthesized optical filter transfer functions with basic sinusoidal filter function.
Figure 10:
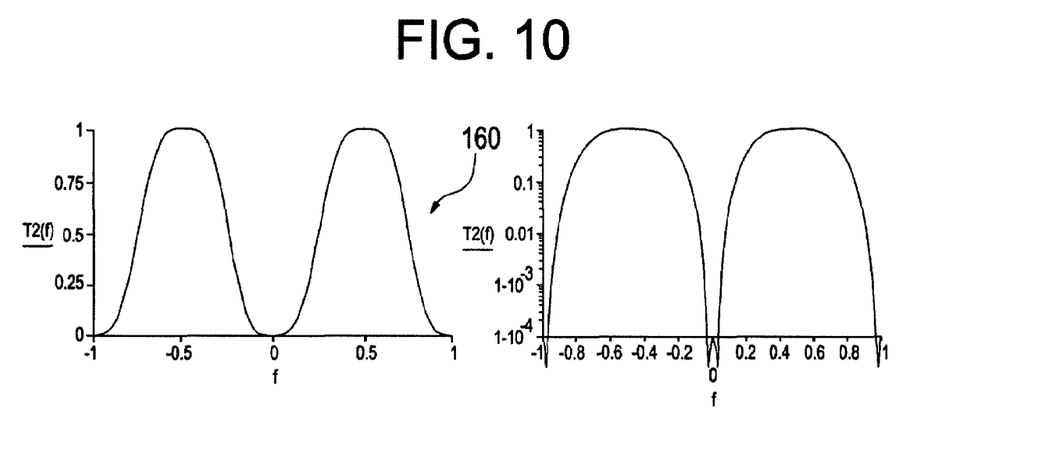
FIG. 10 shows sample of basic Fourier-synthesized optical filter transfer functions with a flat-top filter response with stopbands.
Figure 11:
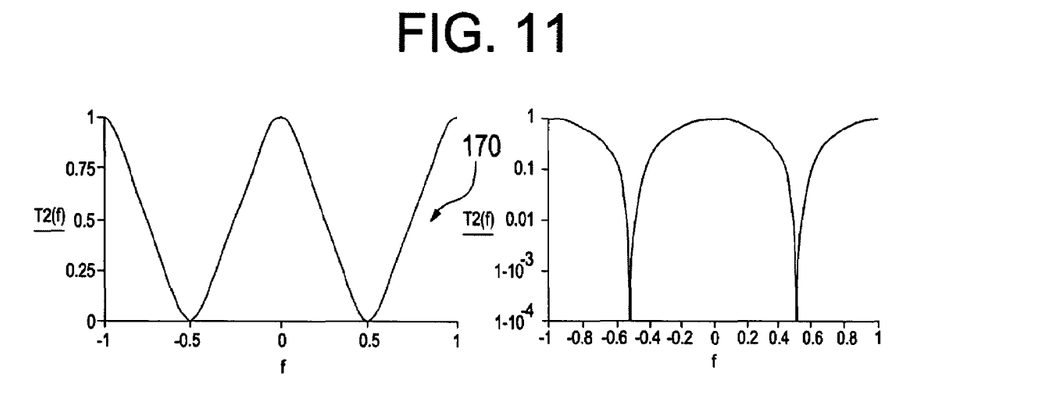
FIG. 11 shows sample of basic Fourier-synthesized optical filter transfer functions with a linear triangular filter function.

Samples of basic Fourier-synthesized optical filter transfer functions are shown in FIGS. 9, 10, 11 as basic sinusoidal filter function 150, flat-top filter response 160 with stopbands, and linear triangular filter function 170.

Figure 12:
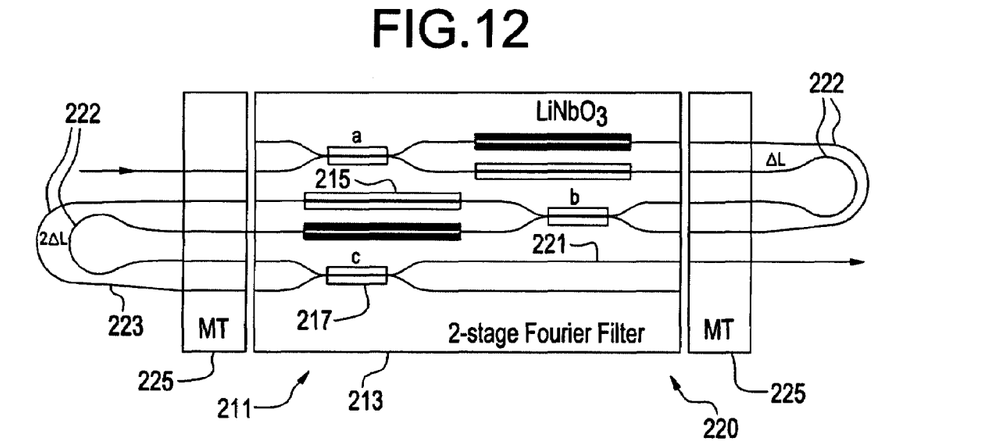
FIG. 12 shows reconfigurable dual-stage delay-line filter hybrid $LiNbO_3$/fiber-delays structure.
Figure 13:
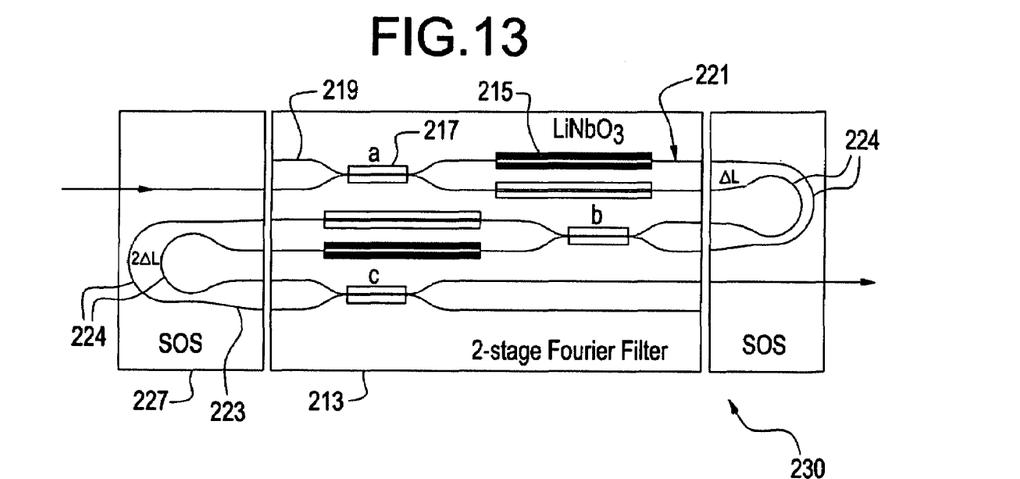
FIG. 13 shows reconfigurable dual-stage delay-line filter hybrid $LiNbO_3$/Silica on Silicon ("SOS") waveguide structure.
Figure 14:
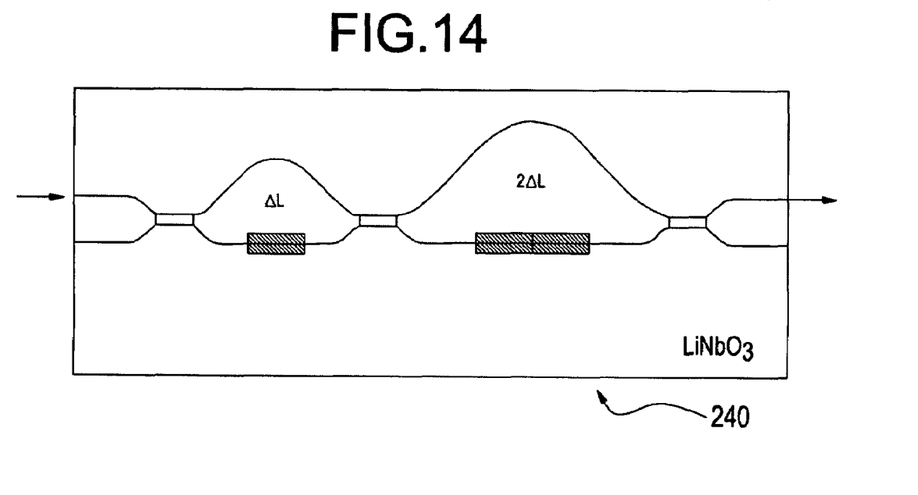
FIG. 14 shows reconfigurable dual-stage delay-line filter all-$LiNbO_3$ structure.

FIGS. 12, 13, 14 show three possible physical implementations of a multi-stage tunable/reconfigurable filter 220, 230, 240, i.e. (a) Hybrid LiNbO$_3$/fiber delay-line structure, (b) Hybrid LiNbO$_3$/silica or silicon waveguide structure, and (c) All LiNbO$_3$ integrated waveguide structure. Note that, in general, other electro-optic waveguide material can be used in place of LiNbO$_3$, and other low-loss waveguide delay-line can also be used in place of fiber optic, or silica or LiNbO$_3$ waveguide delay-line structures.

a) Hybrid LiNbO$_3$/fiber delay-line reconfigurable filter structures 220 are shown in FIG. 12. They consist of electro-optically active phase tuners and tunable directional couplers fabricated on an electro-optical chip 213 such as lithium niobate and the unequal optical waveguide delay-line sections 225, fabricated using low-loss unequal-length optical fiber differential delay-line pairs 223 comprising optical fibers 222. The overall devices are interconnected and assembled as shown in FIG. 12.

b) Hybrid LiNbO$_3$/low-loss integrated waveguide delay-line reconfigurable filter structures 230 are shown in FIG. 13. They consist of electro-optically active phase tuners and tunable directional couplers fabricated on an electro-optical chip 213 such as lithium niobate and unequal optical waveguide delay-line chip 227, other fabricated substrate such as low-loss silicon or SOS waveguide circuit 223 comprising SOS waveguides 224. The overall devices are interconnected and assembled as shown in FIG. 13.

c) All-LiNbO$_3$ low-loss integrated waveguide delay-line reconfigurable filter structures 240 are shown in FIG. 14. They consist of electro-optically active phase tuners and tunable directional couplers and all the optical waveguide delay-line pairs, fabricated on electro-optical material (such as lithium niobate, etc.) The overall device is shown in FIG. 14.

Figure 15:
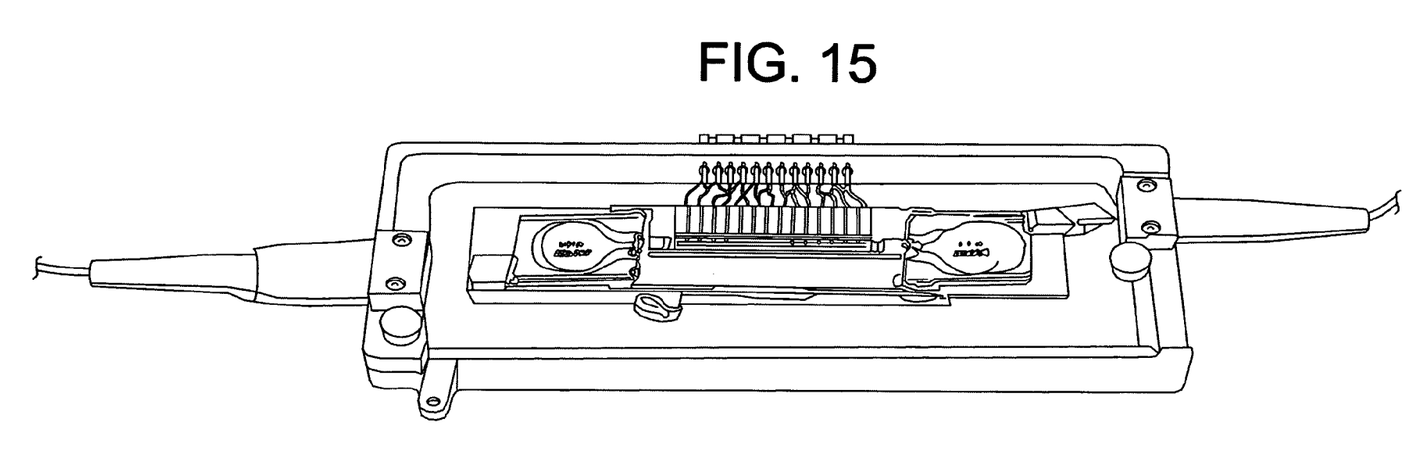
FIG. 15 shows an actual fabricated hybrid $LiNbo_3$/SOS dual-stage Fourier filter schematically shown in FIG. 13.

FIG. 15 shows a hybrid LiNbo$_3$/SOS dual-stage Fourier filter schematically shown in FIG. 13. The actual LiNbo$_3$ waveguide 200 has lower loss than SOS waveguide.

Figure 16:
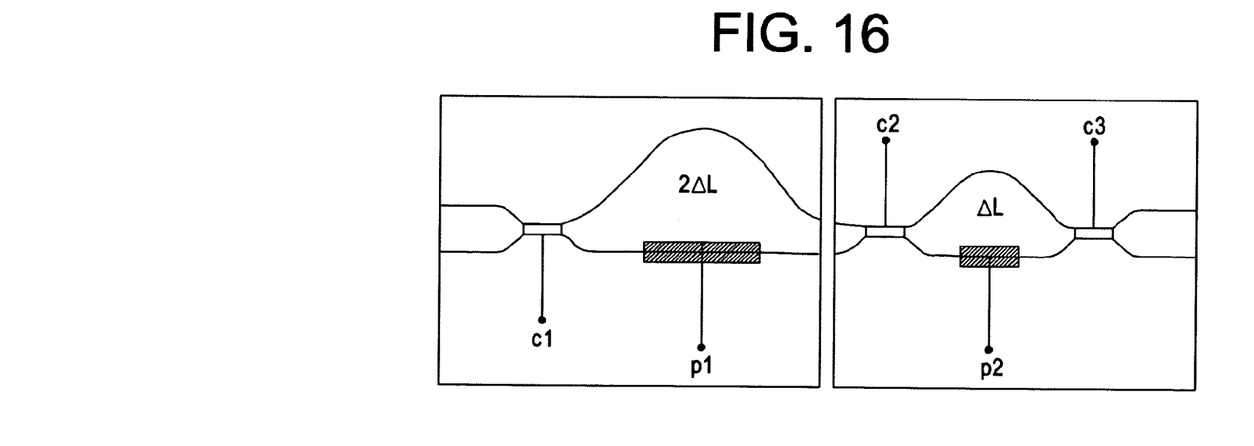
FIG. 16 shows a schematic of an independent dual-stage Fourier filter.
Figure 17:
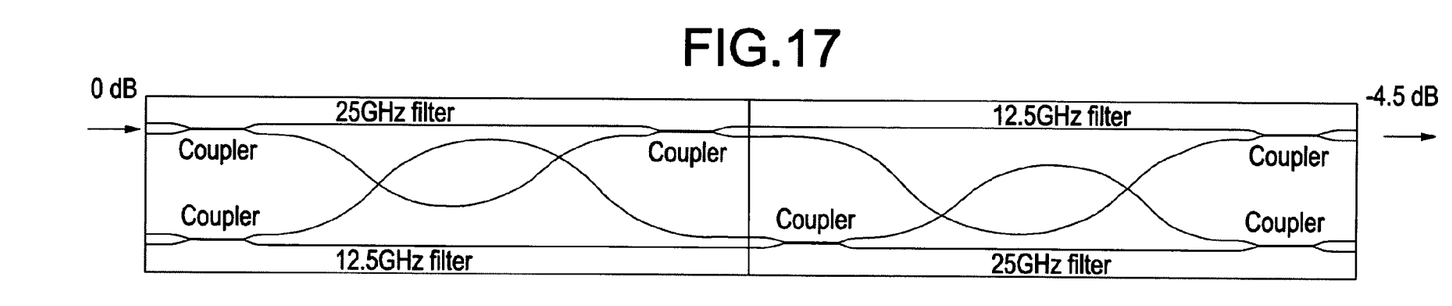
FIG. 17 shows two independent dual-stage Fourier filters with upper channel and lower channel integration.
Figure 18:
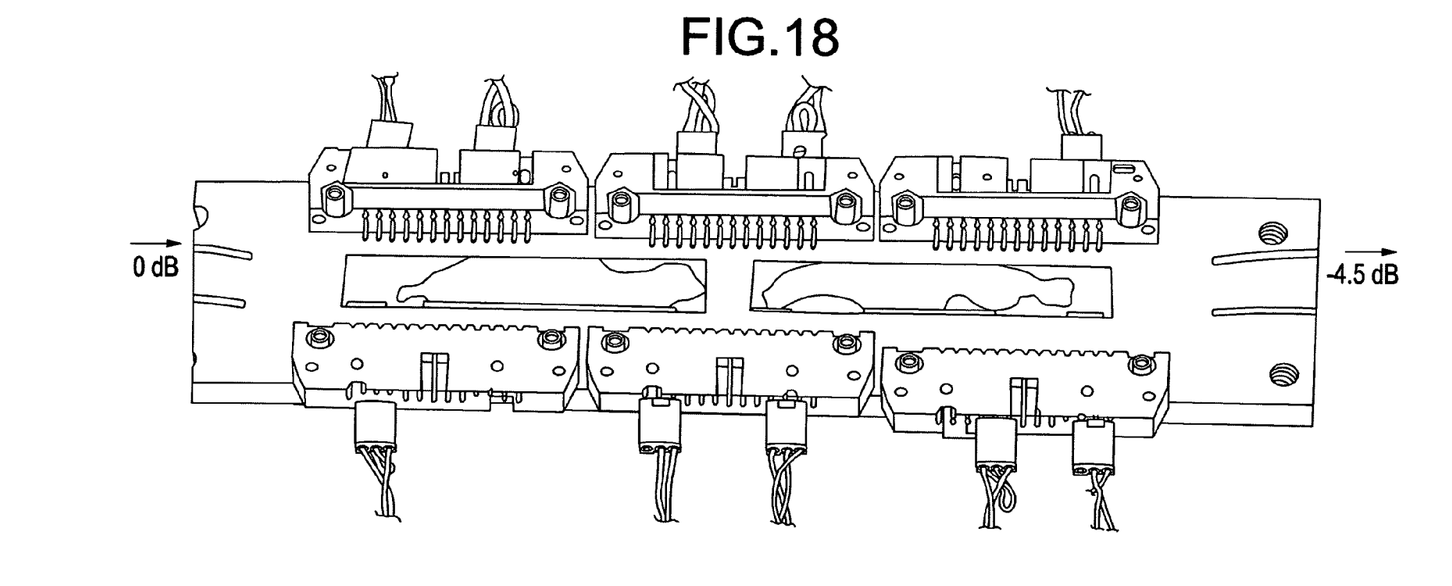
FIG. 18 shows the two independent dual-stage Fourier filters in an actual assembly, fabricated in an all-$LiNbO_3$ structure.

All LINbo$_3$ dual-stage Fourier filters are shown in FIGS. 16, 17, 18.

FIG. 16 shows a schematic of an independent dual-stage Fourier filter.

FIG. 17 shows a schematic of two independent dual-stage Fourier filters with upper channel and lower channel, integrated on the same structure.

FIG. 18 shows the two independent dual-stage Fourier filters in an actual assembly.

Figure 19:
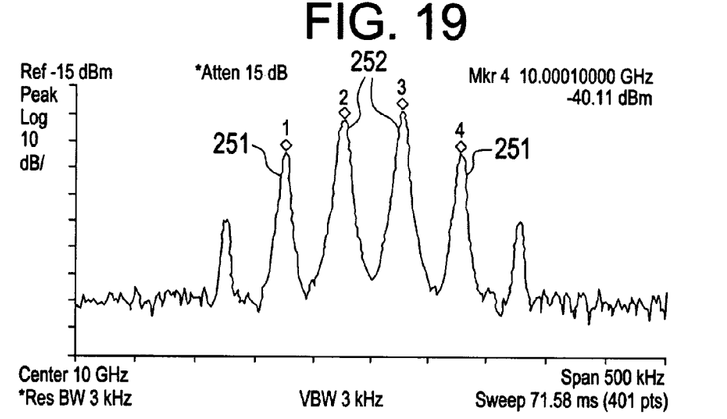
FIGS. 19 shows signals from a phase-modulated link with a dual-stage filter, associated spectrums with poor $3^{rd}$ order intermods.
Figure 20:
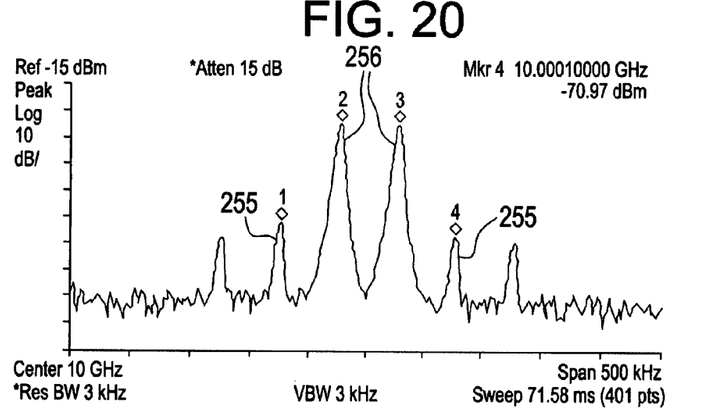
FIG. 20 shows intermod spectrum with intermediately lower $3^{rd}$ order intermods when the filter is tuned to an arbitrary setting.
Figure 21:
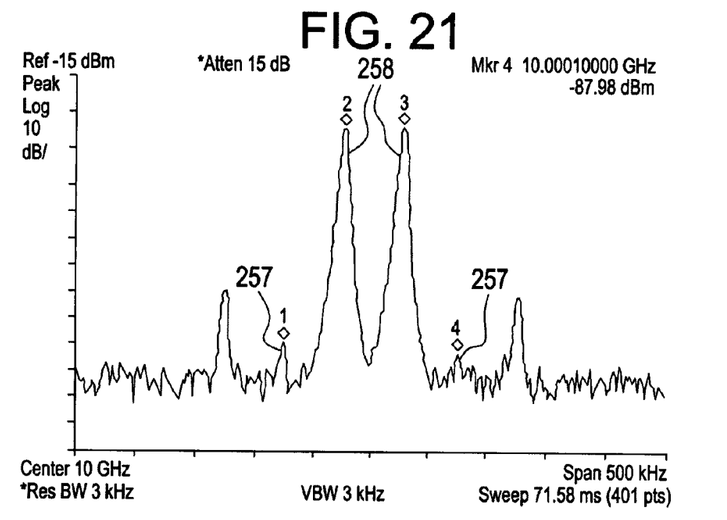
FIG. 21 shows how a reconfigurable dual-stage Fourir filter can dramatically change the $3^{rd}$ order intermods by >40 dB, corresponding to >20 dB improvement over standard MZ link. It shows results of a fine tune via loss-less electro-optical effect, allowing precise/deep signal cancellation.

FIGS. 19, 20, 21 show signals from a phase-modulated link with a dual-stage filter. The RF spectrum is shown with different Filter settings. FIG. 19 shows associated spectrums with poor $3^{rd}$ order intermods 251 compared with fundamental signals 252.

FIG. 20 shows an intermod spectrum with intermediately lower $3^{rd}$ order intermods 255, when the filter is tuned to another arbitrary setting, compared with fundamental signals 256.

FIG. 21 shows how a reconfigurable dual-stage Fourier filter can dramatically change the $3^{rd}$ order intermods 257 by >40 dB, corresponding to >20 dB improvement over standard MZ link, when the filter is a fine tuned via loss-less electro-optical effect, allowing precise/deep signal cancellation, and fundamental signals 258.

Unlike other approaches, the high-dynamic-range is achieved not by linearization of the modulator itself, but by linearizing and intermod cancelling of the received signal remote from the modulator, using a reconfigurable filter as the key analog optical signal processor.

Fourier filter characteristics can be systematically synthesized and very precisely tuned to achieve very high degree of linearity.

The invention is even more effective at higher RF frequencies. A reconfigurable filter requires no high frequency electronics. Delay-line filters at higher frequencies require shorter delay-lines, which means more compact, and lower-loss filters can be made.

The invention provides a new high-dynamic-range, high frequency RF fiber-optic link that makes it practical to implement in real world environment with extreme temperature range with maintenance free, bias free passive phase modulators.

The invention provides electro-optical components for high-dynamic-range RF fiber-optic links at high frequencies 10 G-90+GHz and an RF fiber-optic link that is suitable for operation in real-world harsh environments with large temperature changes.

The new optical linearization technique and electro-optical components achieve enhanced spur-free high-dynamic-ranges.

The invention is practical to implement with high-precision tunable/reconfigurable linearization element, with no need for difficult high-frequency RF electronics.

Implementation is provided at extremely high RF frequencies of 40, 60, 90 GHz in simpler, more compact, lower loss monolithic two-to-three stage delay-line filters for high RF frequencies.

Develop and incorporate the next generation of ultra-low Vpi high-frequency phase modulators using the invention to incorporate high-speed electro-optical polarization controllers, replacing long phase modulator fibers with ordinary single mode fiber.

While the invention has been described with reference to specific embodiments, modification and variations of the invention may be constructed without departing from the scope of the invention, which is defined in the following claims.

I claim:

1. A method of using a fiber optic link, comprising:
   providing a remote site;
   providing an antenna at the remote site;
   providing a phase modulator at the remote site;
   receiving radio frequency signals with the antenna;
   providing the radio frequency signals from the antenna to the phase modulator at the remote site;
   providing an electronics bay at a distance from the remote site;
   providing a receiver in the electronics bay;

providing a laser;
providing a first optical fiber between the laser and the phase modulator;
providing an optical filter at the receiver in the electronics bay;
providing a photodetector at the receiver in the electronics bay;
directing light from the laser into and through the first optical fiber to the phase modulator at the remote site;
providing a second optical fiber between the remote site and the receiver;
phase modulating the light by the radio frequency signals from the antenna;
transmitting the phase modulated light from the phase modulator directly to the optical filter through the second optical fiber and to the photodetector at the receiver;
tuning the optical filter to remove artifacts not from the radio frequency and effectively suppress intermodulation distortion of the phase modulated signal;
filtering the phase modulated light in the optical filter;
providing the filtered phase modulated light to the photodetector; and
producing a radio frequency signal output from the photodetector with suppressed intermodulation distortion spurious terms.

2. The method of claim 1, wherein the providing the phase modulator comprises providing a bias-free phase modulator and wherein the providing the optical filter comprises providing a multi stage tunable optical filter.

3. The method of claim 1, wherein the providing the optical filter comprises providing a tunable optical filter.

4. The method of claim 1, wherein the providing the optical filter comprises providing a tunable reconfigurable filter.

5. The method of claim 1, wherein the providing the optical filter comprises providing a tunable and reconfigurable optical filter.

6. The method of claim 1, wherein the providing the optical filter comprises providing an optical delay line filter having phase shifter stages with at least one coupler between stages and optical waveguides connected to the coupler.

7. The method of claim 1, wherein the providing the optical filter comprises providing plural tunable couplers, providing optical waveguides connected between the tunable couplers, and providing tunable phase shifters connected between the tunable couplers, and selectively coupling the tunable phase shifters with the tunable couplers.

8. The method of claim 7, wherein the providing optical waveguides comprises providing the optical waveguides connected in parallel branches between the tunable couplers, and wherein the tunable phase shifters are connected in one of the parallel branches.

9. The method of claim 7, wherein the providing optical waveguides further comprises connecting the optical waveguides in parallel branches between the tunable couplers, and connecting the tunable phase shifters in first branches of the parallel branches and connecting distinct tunable phase shifters in second branches of the parallel branches.

10. The method of claim 7, further comprising providing the tunable phase shifters mounted on a two stage Fourier filter chip and providing first parts of the optical waveguides mounted on the filter chip, and providing second parts of the optical waveguides mounted on connected substrates and connecting the first and second parts of the optical waveguides.

11. The method of claim 1, wherein the optical filter comprises transfer characteristics reconfigured to suppress distortion signals formed by modulation/demodulation process during conversion of the radio frequency signals to optical signals and back to the radio frequency signals.

12. The method of claim 1, wherein the optical filter is a reconfigurable multi-stage delay-line Fourier filter for suppressing $3^{rd}$ order intermodulation distortion and for improving Spurious-free dynamic-range of radio frequency fiber-optic link.

13. Electro-optical fiber optic link apparatus, comprising:
a remote site;
an antenna at the remote site for receiving radio frequency signals with the antenna;
a phase modulator at the remote site;
a connection between the phase modulator and the antenna for providing the radio frequency signals from the antenna to the phase modulator at the remote site;
an electronics bay at a distance from the remote site;
a receiver in the electronics bay;
a laser;
a first optical fiber extending between the laser and the remote site;
the laser connected to the first optical fiber for directing light from the laser into and through the first optical fiber to the phase modulator at the remote site and phase modulating of the light by the radio frequency signals from the antenna;
an optical filter at the receiver in the electronics bay;
a second optical fiber extending between the phase modulator and the optical filter; for transmitting the phase modulated light from the phase modulator to the optical filter and for filtering the phase modulated light in the optical filter to convert the phase modulated signal into an intensity modulated signal and to suppress intermodulation distorted spurious signals from the phase modulated signal from the antenna;
a photodetector at the electronics bay in communication with the optical filter for providing the filtered phase modulated light to the photodetector; and
a radio frequency signal output produced from the photodetector.

14. The apparatus of claim 13, wherein the phase modulator comprises a bias-free phase modulator and wherein the optical filter is a multi stage tunable optical filter.

15. The apparatus of claim 13, wherein the optical filter comprises a tunable optical filter.

16. The apparatus of claim 13, wherein the optical filter comprises a tunable reconfigurable filter.

17. The apparatus of claim 13, wherein the optical filter comprises a tunable and reconfigurable optical filter.

18. The apparatus of claim 13, wherein the optical filter comprises an optical delay line filter having phase shifter stages with at least one coupler between stages and optical waveguides connected to the coupler.

19. The apparatus to claim 13, wherein the optical filter comprises plural tunable couplers, optical waveguides connected between the tunable couplers, and tunable phase shifters connected between the tunable couplers.

20. The apparatus of claim 19, wherein the optical waveguides are connected in parallel branches between the tunable couplers, and wherein the tunable phase shifters are connected in one of the parallel branches.

21. The apparatus of claim 19, wherein optical waveguides are connected in parallel branches between the tunable couplers, and wherein the tunable phase shifters are connected in first branches of the parallel branches and distinct tunable phase shifters are connected in second branches of the parallel branches.

22. The apparatus of claim 19, wherein the tunable phase shifters are mounted on a two stage Fourier filter chip and first parts of optical waveguides connected to the tunable couplers and the tunable phase shifters are mounted on the filter chip, and second parts of the optical waveguides are mounted on connected substrates and are connected to the first parts of the optical waveguides.

23. The apparatus of claim 19, wherein the tunable phase shifters and tunable couplers are fabricated on electro-optical material and the waveguides are fabricated using unequal-length optical fiber differential delay-line pairs.

24. The apparatus of claim 19, wherein the tunable phase shifters and tunable couplers are fabricated on electro-optical material and the waveguides are fabricated using unequal-length optical waveguide differential delay-line pairs.

25. The apparatus of claim 19, wherein the tunable phase shifters and tunable couplers and the waveguides are fabricated on electro-optical material.

26. The apparatus of claim 13, wherein the optical filter comprises a multi-stage tunable and reconfigurable optical filter fabricated on electro-optic material, so that it can be effectively fine-tuned and used to cancel intermodulation distortion signals of a phase-modulated RF fiber-optic link to achieve Spurious-free dynamic-range.

27. The apparatus of claim 13, wherein the optical filter is a tunable reconfigurable optical filter with transfer characteristics reconfigured to suppress distortion signals formed from modulation/demodulation by the phase modulator during the conversion of the radio frequency signals to optical signals and back to the radio frequency signals.

28. The apparatus of claim 13, wherein the optical filter is a reconfigurable multi-stage delay-line Fourier filter for suppressing $3^{rd}$ order intermodulation distortion and for improving Spurious-free dynamic-range of radio frequency fiber-optic link.

* * * * *